United States Patent
Prokhorov et al.

(10) Patent No.: US 8,977,499 B1
(45) Date of Patent: Mar. 10, 2015

(54) AUDITORY INTERFACE FOR AUTOMATED DRIVING SYSTEM

(71) Applicant: Toyota Motor Engineering & Manufacturing North America, Inc., Erlanger, KY (US)

(72) Inventors: Danil Prokhorov, Canton, MI (US); Yasuo Uehara, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/088,218

(22) Filed: Nov. 22, 2013

(51) Int. Cl.
  *B62D 6/00* (2006.01)
  *G01C 21/36* (2006.01)
(52) U.S. Cl.
  CPC .................................. *G01C 21/36* (2013.01)
  USPC ............................................. 701/538; 701/36
(58) Field of Classification Search
  USPC ...................................... 701/538, 36
  See application file for complete search history.

(56) References Cited

U.S. PATENT DOCUMENTS

| | | | |
|---|---|---|---|
| 6,363,322 | B1 | 3/2002 | Millington |
| 7,274,287 | B2 | 9/2007 | Dobler et al. |
| 8,260,482 | B1 | 9/2012 | Szybalski et al. |
| 2009/0312912 | A1* | 12/2009 | Braegas ......................... 701/42 |

FOREIGN PATENT DOCUMENTS

JP  20080265503 A  11/2008

OTHER PUBLICATIONS

Y. Yang, B. Reimer, B. Mehler, A. Wong, M. McDonald, "Exploring Differences in the Impact of Auditory and Visual Demands on Driver Behavior", Proceedings of the 4th International Conference on Automotive User Interfaces and Interactive Vehicular Applications (Automotive UI '12), Oct. 17-19, 2012, Portsmouth, NH, USA, pp. 173-177.

\* cited by examiner

*Primary Examiner* — Mary Cheung
*Assistant Examiner* — Yuen Wong
(74) *Attorney, Agent, or Firm* — Christopher G. Darrow; Young Basile Hanlon & MacFarlane, P.C.

(57) ABSTRACT

A computing device and methods for operating an auditory interface for an automated driving system are disclosed. One example method of automated driving using an auditory interface includes receiving, from a user, an indication associating an auditory icon with a vehicle action at the auditory interface. The method further includes receiving, from a path planner application, an indication of an upcoming implementation of the vehicle action by one or more vehicle systems and sending, to an audio system, a command to implement the auditory icon associated with the vehicle action before the one or more vehicle systems implements the vehicle action.

15 Claims, 2 Drawing Sheets

AUDITORY INTERFACE FOR AUTOMATED DRIVING SYSTEM

BACKGROUND

Partially-automated or monitored driving systems are designed to assist drivers in operating a vehicle safely and efficiently on the road, for example, using techniques such as eye-tracking of the driver to send a warning when the driver becomes inattentive and lane tracking of the vehicle to send a warning to the driver when the vehicle is leaving its lane. Many of the warnings generated by partially-automated or monitored driving systems are not welcomed by the driver and can cause unnecessary concern based on the intrusive nature and late timing of the warning. Once a warning is received, it is immediately necessary for the driver to intervene.

Fully automated driving systems are designed to operate a vehicle on the road without driver interaction or other external control, for example, self-driving vehicles. However, fully automated driving systems are not currently designed to notify the driver of upcoming vehicle operations in order to prepare the driver in terms of what to expect from the automated driving system's control of the vehicle.

SUMMARY

The automated driving system described here can autonomously operate the vehicle within ranges of target values (e.g. velocities, accelerations, decelerations, distances to objects, vehicle locations, and vehicle orientations) along a route specified, at least in part, by a path planner application. An auditory interface for the automated driving system can be designed to allow the driver to link notifications from the audio system to upcoming autonomous operations, e.g. vehicle actions, to be performed by the vehicle based on the route specified by the path planner application and the environment surrounding the vehicle. The notifications can include soft warnings, e.g. pleasant or neutral sounds or sequences of sounds, strongly correlated with or modulated by expected actions implemented by the automated driving system.

In one implementation, a computing device is disclosed. The computing device includes one or more processors for controlling the operations of the computing device and a memory for storing data and program instructions used by the one or more processors. The one or more processors are configured to execute instructions stored in the memory to: receive, from a user, an indication associating an auditory icon with a vehicle action; receive, from a path planner application, an indication of an upcoming implementation of the vehicle action by one or more vehicle systems; and send, to an audio system, a command to implement the auditory icon associated with the vehicle action before the one or more vehicle systems implements the vehicle action.

In another implementation, a computer-implemented method of automated driving is disclosed. The method includes receiving, from a user, an indication associating an auditory icon with a vehicle action; receiving, from a path planner application, an indication of an upcoming implementation of the vehicle action by one or more vehicle systems; and sending, to an audio system, a command to implement the auditory icon associated with the vehicle action before the one or more vehicle systems implements the vehicle action.

BRIEF DESCRIPTION OF THE DRAWINGS

The description herein makes reference to the accompanying drawings wherein like reference numerals refer to like parts throughout the several views, and wherein.

DETAILED DESCRIPTION

This disclosure describes various embodiments of an auditory interface for an automated driving system and methods and devices for implementing the auditory interface. The auditory interface allows a driver to interact with the automated driving system and link upcoming or planned vehicle actions to alerts, e.g. sounds or sequences of sounds, to be played by an audio system to the driver before the automated driving system implements the associated vehicle action. The auditory interface is a convenient and non-intrusive way for the driver to be apprised, in advance, of actions to be undertaken by the vehicle and to be alerted to a potential need to take action with respect to one or more vehicle systems if needed.

Figure 1:
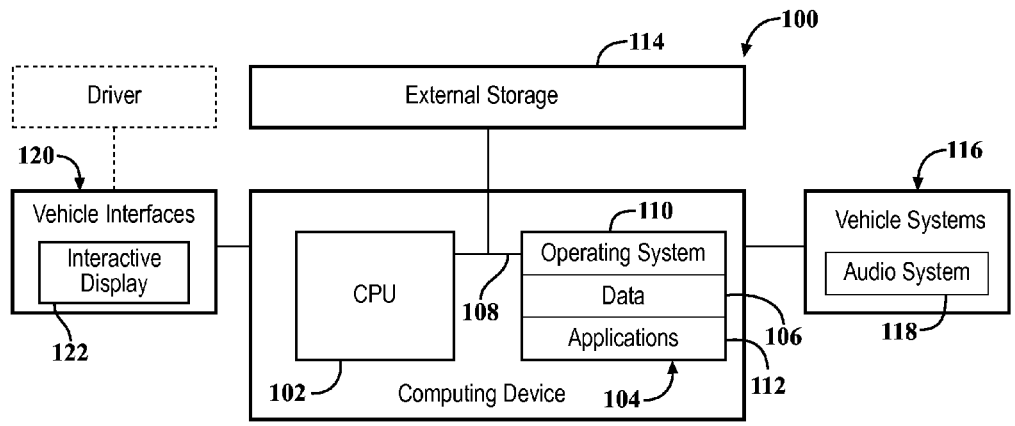
FIG. 1 is a block diagram of a computing device for implementing an auditory interface for an automated driving system.

FIG. 1 is a block diagram of a computing device 100 for implementing an auditory interface for an automated driving system. The computing device 100 can be any type of vehicle-installed, handheld, desktop, or other form of single computing device, or can be composed of multiple computing devices. The processing unit in the computing device can be a conventional central processing unit (CPU) 102 or any other type of device, or multiple devices, capable of manipulating or processing information. The memory 104 in the computing device can be a random access memory device (RAM) or any other suitable type of storage device. The memory can include data 106 that is accessed by the CPU using a bus 108.

The memory 104 can also include an operating system 110 and installed applications 112, the installed applications 112 including programs that permit the CPU 102 to implement the auditory interface for the automated driving system as described below. The computing device 100 can also include secondary, additional, or external storage 114, for example, a memory card, flash drive, or any other form of computer readable medium. In one embodiment, the installed applications 112 can be stored in whole or in part in the external storage 114 and loaded into the memory 104 as needed for processing.

The computing device 100 can also be coupled to one or more vehicle systems 116. The vehicle systems 116 can, for example, include an audio system 118. The audio system 118 can be configured to provide sound within the vehicle, for example, using a plurality of speakers located at various points within the vehicle cabin as further described in FIG. 2. The computing device 100 can also be coupled to one or more vehicle interfaces 120 configured to receive input from the driver and provide feedback to the driver of the vehicle. The vehicle interfaces 120 can include, for example, an interactive display 122. The interactive display 122 can be configured to allow the driver to send commands to the computing device 100 intended to control the operation of the audio system 118 as further described in FIG. 3. Other vehicle interfaces 120, for example, a voice recognition system, could also be configured to receive driver commands regarding various vehicle systems 116 such as the audio system 118.

In the example computing device 100 described in FIG. 1, the applications 112 stored in the memory 104 can also include autonomous driving applications such as a data analyzer, a path planner, a target value generator, an error detector, an adaptive module, or any other application configured to implement the autonomous driving system by performing such actions as identifying the driver, planning a route for autonomous operation of the vehicle, and improving positional accuracy of the vehicle.

Figure 2:
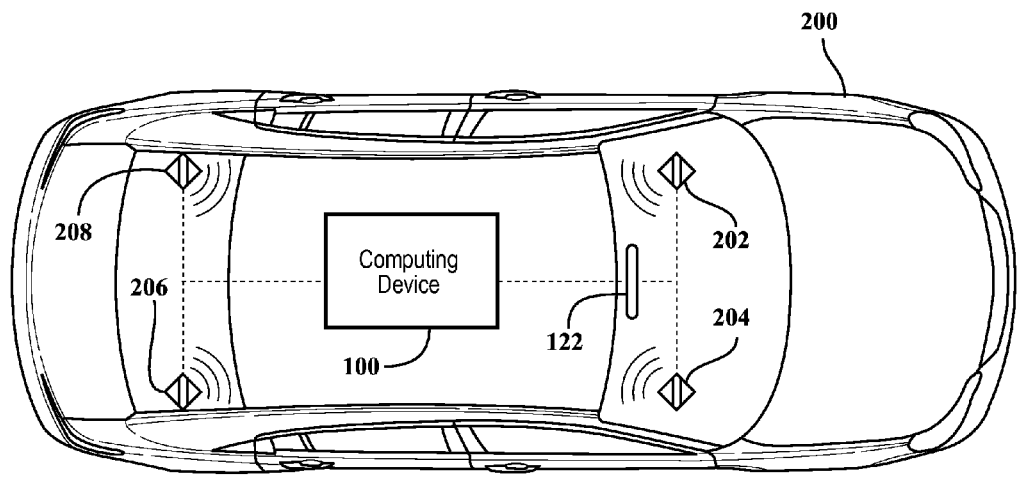
FIG. 2 is a schematic illustration of a vehicle including the computing device of FIG. 1.

FIG. 2 shows a schematic of a vehicle 200 including the computing device 100 described in FIG. 1. The computing device 100 can be located within the vehicle 200 as shown in FIG. 2 or can be located remotely from the vehicle 200 in an alternate location (not shown). If the computing device 100 is remote from the vehicle, the vehicle 200 can include the capability of communicating with the computing device 100.

The vehicle 200 can also include a plurality of components of the audio system 118, such as speakers 202, 204, 206, 208 located within the corners of the cabin of the vehicle 200. In this example, speaker 202 is to the left front of the driver, speaker 204 is to the right front of the driver, speaker 206 is to the right rear of the driver, and speaker 208 is to the left rear of the driver within the cabin of the vehicle 200. However, other configurations or numbers of speakers 202, 204, 206, 208 are also possible. The speakers 202, 204, 206, 208 can be in communication with the computing device 100 and configured to receive commands from the audio system 118 and/or the computing device 100. The speakers 202, 204, 206, 208 are shown with representative sound waves indicating the direction of sound travel from each of the speakers 202, 204, 206, 208.

The vehicle 200 can also include one or more vehicle interfaces 120 that allow the driver of the vehicle 200 to send commands to the vehicle 200 and receive feedback from vehicle systems 116. One example vehicle interface 120 shown in FIG. 2 is the interactive display 122. Using the interactive display 122, the driver can both view information related to various vehicle systems 116 and enters commands to control various vehicle systems 116 as further described in FIG. 3. Other example vehicle interfaces 120 (not shown) can include a steering wheel, accelerator pedal, brake pedal, knob or switch-based audio controls, vehicle climate controls, or any other vehicle interface 120 allowing the driver to interact with the vehicle 200.

Figure 3:
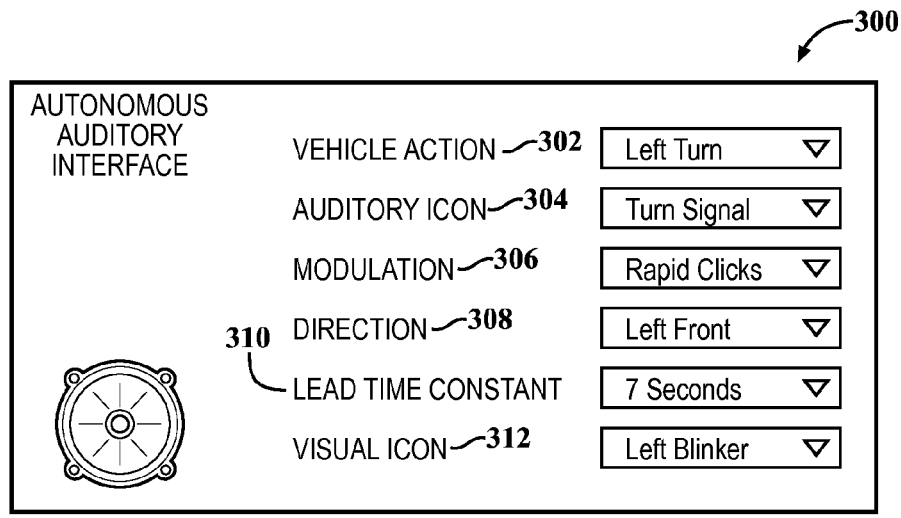
FIG. 3 is an example auditory interface for the automated driving system implemented using the computing device of FIG. 1.

FIG. 3 is an example auditory interface 300 for the automated driving system implemented using the computing device 100 of FIG. 1. The auditory interface 300 can be displayed to the driver, for example, using the interactive display 122 described in reference to FIGS. 1 and 2. The auditory interface 300 can be configured to allow the driver to interact with vehicle systems 116 such as the audio system 118 and other applications 112 configured to implement the automated driving system. One such application 112 accessed via the auditory interface 300 can be a path planner application configured to determine a route for the vehicle 200 to follow based on its current location with respect to the surrounding environment and based on its planned destination. The path planner application is configured to determine future vehicle actions to be performed by various vehicle systems 116.

For example, the auditory interface 300 can be configured to accept inputs from the driver designed to link outputs of the audio system 118 to planned or upcoming vehicle actions as indicated by the path planner application. The auditory interface 300 can be configured to accept various inputs including touch inputs, gesture inputs, dial or knob-based inputs, keyboard-based inputs, voice inputs, or any other type of input configured to allow the driver to populate one of the settings fields displayed on the auditory interface 300. The auditory interface 300 can include a variety of settings fields, including but not limited to a vehicle action field 302, an auditory icon field 304, a modulation field 306, a direction field 308, a lead time constant field 310, and a visual icon field 312. Each of the settings fields displayed by the auditory interface 300 for the automated driving system is further described below.

The vehicle action field 302 of the auditory interface 300 includes a drop-down selection but could also include or alternatively be designed as a driver-entry field. The vehicle action field 302 can be populated by the driver from a list of traditional vehicle actions or changes in vehicle state that occur along a planned route. For example, and as shown in FIG. 3, one upcoming vehicle action that could be used to populate the vehicle action field 302 is a left turn. By selecting or entering "Left Turn" in the vehicle action field 302, the driver is indicating to the automated driving system that the entries in the remaining settings fields below the vehicle action field 302 will correspond to responses from various vehicle systems 116 based on the path planner application indicating a left turn is upcoming or imminent. Other vehicle actions that can be entered or selected in the vehicle action field 302 can include the following: right turn, acceleration, deceleration, lateral lane motion or lane maneuvers, starting (e.g. from a stopped position), stopping, reversing, taking an entrance ramp, taking an exit ramp, etc.

The auditory icon field 304 of the auditory interface 300 includes a drop-down selection but could also be designed as a driver-entry field. The auditory icon field 304 is configured to be populated with an indication of a meaningful sound, or sequence of sounds, which may be artificial or real, designed to represent the upcoming vehicle action described in the associated vehicle action field 302. These meaningful sounds or sequences of sounds are the auditory icons. In the example where the vehicle action field 302 is populated with "Left Turn," a logical auditory icon to be selected by the driver or offered by the automated driving system would be one consistent with the sequence of sounds made by a turn signal (e.g. a blinker) once activated. For example, the auditory icon could be a sequence of clicking sounds represented by the phrase "Turn Signal" for population of the auditory icon field 304 as shown in FIG. 3.

In another example (not shown) the auditory icon could be the simulated sounds of an engine. These engine sounds could be tied to the vehicle action "Vehicle Acceleration" as populated within the vehicle action field 302 and be represented by the label "Engine Revving" in the auditory icon field 304. In another example, the auditory icon could be a speech-based announcement designed to convey the planned vehicle action, for example, the phrase "Left Turn Ahead" could be played through one or more of the speakers 202, 204, 206, 208 to the driver. These are just a few example pairings for the vehicle action field 302 and the auditory icon field 304, many other examples are possible.

The modulation field 306 of the auditory interface 300 includes a drop-down selection but could also be designed as a driver-entry field. The modulation field 306 is configured to be populated with an indication of how the spacing, timbre, pitch, or speed of a singular sound or sequence of sounds is to be produced when the audio system 118 implements the given auditory icon populated in the auditory icon field 304. Humans are sensitive to changes in rhythm, pitch, timbre, and other auditory parameters, so allowing the driver to adjust the modulation level using the modulation field 306 can assist, for example, in avoiding a "chatter box" effect that would distract or annoy the driver. In addition, the same auditory icon can be used for similar upcoming vehicle actions by selecting a different modulation level, for example, in the form of differing volumes or speeds of the sound or sequence of sounds, to distinguish between the vehicle actions.

In the example shown in FIG. 3 where the vehicle action "Left Turn" is populated within the vehicle action field 302 and the auditory icon "Turn Signal" is populated within the auditory icon field 304, the driver can populate the modulation field 306 with a representation of the speed of the blinking sequence of sounds, for example, "Rapid Clicks," to indicate that the driver prefers close spacing between each clicking sound when the audio system 118 produces the sequence of sounds indicative of an upcoming left turn as indicated by the path planner application. In another example where the vehicle action "Vehicle Acceleration" is populated within the vehicle action field 302 and the auditory icon "Engine Revving" is populated within the auditory icon field 304, the driver can populate the modulation field 306 with a representation of the engine increasing in RPMs, using, for example, the text "Revving Up" to populate the modulation field 306.

The direction field 308 of the auditory interface 300 includes a drop-down selection but could also be designed as a driver-entry field. The direction field 308 is configured to be populated with an indication of the location from which the audio system 118 will produce the sound or sequence of sounds represented in the auditory icon field 304. For example, and as shown in FIG. 2, the vehicle 200 can include speakers 202, 204, 206, 208 in each corner of the passenger cabin. The location of single speaker of group of speakers (e.g. front speakers 202, 204, rear speakers 206, 208, left-front speaker 202, and right speakers 204, 206) can be used to populate the direction field 308. In another example (not shown) the audio system 118 can include sound projecting capabilities allowing the audio system 118 to project a sound in a specific direction, for example towards where the driver is located. In the example where the action "Left Turn" is populated within the vehicle action field 302, the driver can populate the direction field 308 with a representation of the location of speaker 202, e.g. "Left Front" as shown in FIG. 3.

The lead time constant field 310 of the auditory interface 300 includes a drop-down selection but could also be designed as a driver-entry field. The lead time constant field 310 is configured to be populated with an indication of the amount of time before a given vehicle action to produce the associated auditory icon represented in the auditory icon field 304. For example, when the vehicle action field 302 is populated with "Left Turn" a longer lead time may be desirable to the driver to alert the driver of the upcoming left turn than would be necessary to alert the driver of upcoming acceleration or deceleration vehicle actions. In the example shown in FIG. 3, the lead time constant field 310 is populated with the value "7 Seconds" indicating that the "Turn Signal" auditory icon will be produced by the audio system 118 starting 7 seconds before the path planner application indicates the vehicle action of a "Left Turn" is to be performed by the vehicle 200. In another example whether the vehicle action field 302 is populated with "Vehicle Acceleration," the lead time constant field 310 can be populated with the value "2 Seconds."

The computing device 100 can be also be configured to override the value populated within the lead time constant field 310 if a specific dynamic situation suddenly develops along the route the vehicle 200 travels. In an example sudden situation, such as an obstacle entering the route of the vehicle 200, the computing device 100 can be configured to implement a suitable filtering/averaging parameter when implementing the auditory icon as soon as the specific dynamic situation arises so as to avoid potentially distracting changes to the sounds or sequences of sounds (e.g. "chatter box" effect).

The visual icon field 312 of the auditory interface 300 includes a drop-down selection but could also be designed as a driver-entry field. The visual icon field 312 is configured to be populated with an indication of a visual display or prompt to be paired with the audible prompt generated based on the auditory icon. For example, the upcoming "Left Turn" vehicle action can be foreshadowed for the driver using both the "Turn Signal" auditory icon having a certain modulation, direction, and lead time constant and a visual icon, such as a blinking indicator light in the shape of an arrow on the instrument panel of the vehicle 200, a well-known visual indication used in reference to turning or changing lanes. The visual icon thus represents the visual indication to be provided to the driver in addition to the auditory icon.

In the example in FIG. 3, the visual icon field 312 can be populated with the value "Left Blinker" to indicate that the upcoming "Left Turn" vehicle action will also generate a "Left Blinker" visual icon to communicate the intention of the vehicle 200 to turn left to the driver. In another example (not shown), a visual interface that produces visual icons could be paired with the use of auditory icons. In the visual interface example, a color-based display could serve as the visual interface and sections of the display could be colored according to the sounds or sequences of sounds produced based on the auditory icons, thus assisting driver with hearing disabilities. Using paired auditory icons and visual icons can also increase the reliability of communications between the path planner application and the driver since two means are used to communicate, though it is not necessary for the system to implement visual icons.

One advantage of the auditory interface 300 in its use with an automated driving system is that the driver can become familiar with expected auditory icons being produced along traditional routes, that is, those routes traveled often by the driver. The driver can both recognize expected auditory icons along these traditional routes and recognize any deviations from the expected auditory icons that could indicate abnormalities along the route that might require the driver to interact with or take control of the vehicle 200. For example, hearing an auditory icon indicating that the vehicle 200 plans to accelerate, as opposed to the driver's expected deceleration of the vehicle when the driver sees an approaching obstacle in the path of the vehicle 200, can heighten the awareness of the driver to the situation, as if the driver hears a wrong note in a very familiar tune.

In an alternative example to that described in reference to FIG. 3, the auditory interface 300 can be configured to include pre-populated vehicle action fields 302 and corresponding auditory icon fields 304, modulation fields 306, direction fields 308, lead time constant fields 310, and visual icon fields 312 based on a standardized or programmed list of sounds or sequences of sounds and planned or upcoming vehicle actions. The pre-populated values in each of the settings fields can be designed to be modified by the driver using the auditory interface 300 or can be left at the standard settings.

Figure 4:
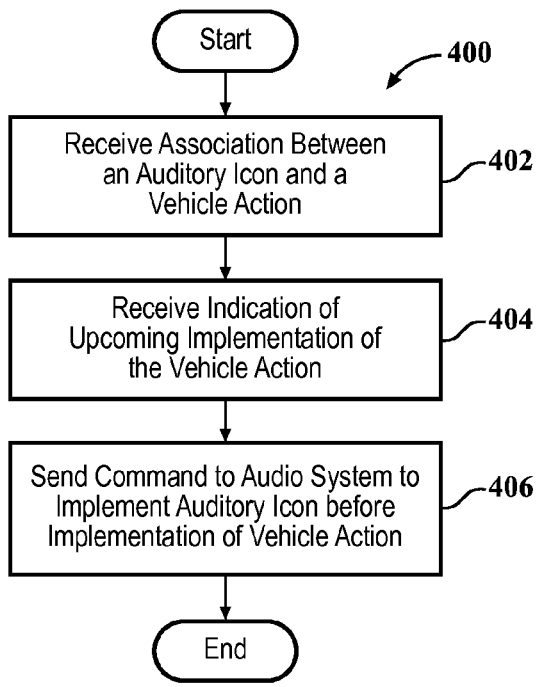
FIG. 4 is a logic flowchart of a process performed using the auditory interface for the automated driving system of FIG. 3.

FIG. 4 is a logic flowchart of a process 400 performed using the auditory interface 300 for the automated driving system of FIG. 3. In step 402 of the process, the computing device 100 can receive an indication of an association between an auditory icon and a vehicle action. For example, the driver can select or enter a vehicle action into the vehicle action field 302 and select or enter an auditory icon into the auditory icon field 304 of the auditory interface 300. The auditory icon can include a sound or sequence of sounds and can be configured to alert the driver about the nature of an upcoming vehicle action. In the example shown in FIG. 3, the vehicle action indicated is a "Left Turn" and the associated auditory icon indicated is a "Turn Signal."

The computing device 100 can also receive an indication associating a modulation level with the auditory icon, the modulation level being configured to alert the driver of the severity of the vehicle action. For example, if the vehicle action field 302 is populated with "Left Turn," the driver can populate the modulation field 306 with "Rapid Clicks" to indicate that the sequence of clicking sounds associated with the upcoming "Left Turn" vehicle action has a short temporal spacing between each click. Similarly, if the vehicle action field 302 is populated with "Left Lane Change," the driver can populate the modulation field 306 with "Slow Clicks" to indicate that the sequence of clicking sounds associated with the upcoming "Left Lane Change" vehicle action has a longer temporal spacing between each click. Hence, the "Left Turn" vehicle action can be discerned as more severe than the "Left Lane Change" vehicle action based on the speed of the clicking sequence of sounds.

The computing device 100 can also receive an indication associating a direction with the auditory icon. For example, the direction field 308 can be populated with an indication of the area of the vehicle cabin from which the auditory icon will be produced, e.g. which speaker or group of speakers 202, 204, 206, 206 will play the auditory icon. The computing device 100 can also receive an indication associating a lead time constant with the auditory icon. For example, the lead time constant field 310 can be populated with an indication of the amount of time before a given vehicle action to play the auditory icon.

The computing device 100 can also receive an indication associating a visual icon with the auditory icon. The visual icon can also be configured to alert the driver of the nature of the upcoming vehicle action, supplementing the use of the auditory icon. For example, the visual icon field 312 can be populated with "Left Blinker" when the auditory icon field 304 is populated with "Turn Signal" indicating that both the sequence of clicking sounds for the turn signal and a left-side blinking light will be displayed to the driver before a "Left Turn" vehicle action.

In step 404 of the process 400, the computing device 100 can receive an indication of an upcoming implementation of the vehicle action by one or more vehicle systems 116. For example, the path planner application can be configured to determine upcoming vehicle actions based on the route of the vehicle 200 and the environment surrounding the vehicle 200. The path planner application can be configured to send a signal to the computing device 100 indicative of an upcoming vehicle action before it is implemented.

In step 406 of the process 400, the computing device 100 can send a command to the audio system to implement the auditory icon associated with the vehicle action before one or more vehicle systems 116 implement the vehicle action. For example, once a vehicle action is planned to be implemented within a given lead time, the path planner application can signal the computing device 100 to implement an auditory icon associated with the planned vehicle action using the audio system 118. As shown in FIG. 3, once the path planner application indicates that a left turn will occur within 7 seconds to the computing device 100, the computing device 100 can send a signal to the audio system 118 to implement the turn signal auditory icon.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. For example, in the embodiments described above, the vehicle 200 is generally described an automobile. However, the vehicle 200 is not limited to an automobile, as the auditory interface 300 for the automated driving system could also be implemented with other vehicles generally controlled by a driver, or operator, such as airplanes, boats, etc. In addition, the vehicle 200 need not be limited to one controlled by a driver or operator, and could be one or more robots or robotic tools performing operations under the control of an equivalent application to a path planner application. The scope of the claims is thus to be accorded the broadest interpretation so as to encompass all such modifications and equivalent structures as is permitted under the law.

What is claimed is:

1. A computing device for implementing an autonomous auditory interface coupled to one or more vehicle systems implementing a vehicle action for automated driving along a planned vehicle path, comprising:
   one or more processors for controlling operations of the computing device; and
   a memory for storing data and program instructions used by the one or more processors, wherein the one or more processors are configured to execute instructions stored in the memory to:
      accept, from a user, an indication associating an auditory icon displayed on the autonomous auditory interface with the vehicle action for automated driving along the planned vehicle path, wherein the vehicle action comprises one of accelerating, decelerating, reversing, and steering;
      receive, from a path planner application, an indication of an upcoming occurrence of the vehicle action for automated driving along the planned vehicle path to be implemented by the one or more vehicle systems;
      send, to an audio system, a command to implement the auditory icon associated with the vehicle action before the one or more vehicle systems implements the vehicle action for automated driving along the planned vehicle path; and
      send, to the one or more vehicle systems, a command to implement the vehicle action for automated driving along the planned vehicle path.

2. The computing device of claim 1, wherein the auditory icon is configured to alert the user of a nature of the vehicle action.

3. The computing device of claim 1, wherein the auditory icon includes a sound or sequence of sounds.

4. The computing device of claim 1, wherein the indication associating the auditory icon with the vehicle action includes a modulation level for the auditory icon.

5. The computing device of claim 4, wherein the modulation level is configured to alert the user of a severity of the vehicle action.

6. The computing device of claim 1, wherein the indication associating the auditory icon with the vehicle action includes a travel direction of a vehicle for the auditory icon.

7. The computing device of claim 1, wherein the indication associating the auditory icon with the vehicle action includes a lead time constant for the auditory icon.

8. The computing device of claim 1, wherein the one or more processors are further configured to:

accept, from the user, an indication associating a visual icon displayed on the autonomous auditory interface with the auditory icon.

9. The computing device of claim 8, wherein the visual icon is configured to alert the user of a nature of the vehicle action.

10. A computer-implemented method for implementing an autonomous auditory interface coupled to one or more vehicle systems implementing a vehicle action for automated driving along a planned vehicle path, comprising:
- accepting, by one or more processors, an indication, from a user, associating an auditory icon displayed on the autonomous auditory interface with the vehicle action for automated driving along the planned vehicle path, wherein the vehicle action comprises one of accelerating, decelerating, reversing, and steering;
- receiving, by one or more processors, an indication from a path planner application of an upcoming occurrence of the vehicle action for automated driving along the planned vehicle path to be implemented by the one or more vehicle systems;
- sending, by one or more processors, a command to an audio system to implement the auditory icon associated with the vehicle action before the one or more vehicle systems implements the vehicle action for automated driving along the planned vehicle path; and
- sending, by one or more processors, a command to the one or more vehicle systems to implement the vehicle action for automated driving along the planned vehicle path.

11. The method of claim 10, wherein the auditory icon includes a sound or sequence of sounds.

12. The method of claim 10, wherein the indication associating the auditory icon with the vehicle action includes a modulation level for the auditory icon.

13. The method of claim 12, wherein the modulation level is configured to alert the user of a severity of the vehicle action.

14. The method of claim 10, wherein the indication associating the auditory icon with the vehicle action includes a travel direction of a vehicle for the auditory icon.

15. The method of claim 10, wherein the indication associating the auditory icon with the vehicle action includes a lead time constant for the auditory icon.

* * * * *

UNITED STATES PATENT AND TRADEMARK OFFICE
CERTIFICATE OF CORRECTION

| | |
|---|---|
| PATENT NO. | : 8,977,499 B1 |
| APPLICATION NO. | : 14/088218 |
| DATED | : March 10, 2015 |
| INVENTOR(S) | : Danil Prokhorov and Yasuo Uehara |

It is certified that error appears in the above-identified patent and that said Letters Patent is hereby corrected as shown below:

In the Specification:

In Column 3, Line No. 38, please delete "enters" and add --enter--.
In Column 5, Line No. 30, please insert --a-- before "single speaker".
In Column 5, Line No. 30, please delete "of group" and add --or group--.
In Column 5, Line No. 57, please delete "whether" and add --where--.
In Column 6, Line No. 29, please insert --a-- before "driver".

Signed and Sealed this
Second Day of February, 2016

Michelle K. Lee
*Director of the United States Patent and Trademark Office*